(12) United States Patent
Zhang et al.

(10) Patent No.: US 8,086,173 B2
(45) Date of Patent: Dec. 27, 2011

(54) METHOD FOR IMPLEMENTING RANDOM ACCESS OF NEW ACCESS NODE AND COMMUNICATION SYSTEM THEREOF

(75) Inventors: Aimin Zhang, Shenzhen (CN); Yanling Lu, Shenzhen (CN); Jiang Li, Shenzhen (CN); Shulan Feng, Shenzhen (CN); Zheng Shang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 333 days.

(21) Appl. No.: 12/403,987

(22) Filed: Mar. 13, 2009

(65) Prior Publication Data

US 2009/0221288 A1    Sep. 3, 2009

Related U.S. Application Data

(63) Continuation of application No. PCT/CN2007/002732, filed on Sep. 17, 2007.

(30) Foreign Application Priority Data

Sep. 15, 2006   (CN) .......................... 2006 1 0153392

(51) Int. Cl.
*H04B 7/14* (2006.01)
*H04B 7/212* (2006.01)
*G08C 15/00* (2006.01)
*H04W 4/00* (2009.01)
*H04W 72/00* (2009.01)
*H04J 1/10* (2006.01)
*H04J 3/06* (2006.01)

(52) U.S. Cl. ........ 455/7; 455/16; 455/435.1; 455/432.1; 455/450; 455/452.1; 370/315; 370/324; 370/350

(58) Field of Classification Search ................ 455/7–16, 455/434, 50, 507, 510, 517; 370/252, 315, 370/319–321, 324, 336, 344, 350
See application file for complete search history.

(56) References Cited

U.S. PATENT DOCUMENTS

2004/0081140 A1    4/2004   Martin
(Continued)

FOREIGN PATENT DOCUMENTS

CN            1689348         10/2005
(Continued)

OTHER PUBLICATIONS

IEEE Computer Society, et al., "IEEE Standard for Local and metropolitan area networks; Part 16: Air Interface for Fixed and Mobile Broadband Wireless Access Systems; Amendment 2: Physical and Medium Access Control Layers for Combined Fixed and Mobile Operation in Licensed Bands and Corrigendum 1," IEEE Std. 802.16e™-2005 and IEEE Std. 802.16™-2004/Cor1-2005 (Amendment and Corrigendum to IEEE Std. 802.16-2004), Feb. 28, 2006, 864 pages.

(Continued)

*Primary Examiner* — Michael Thier
*Assistant Examiner* — Scott Trandai
(74) *Attorney, Agent, or Firm* — Slater & Matsil, L.L.P.

(57) ABSTRACT

A method for implementing a random access of a new access node and a system thereof are provided, which belong to a wireless communication field, and enable the new access node within the coverage of relay stations to implement the random access. In the application, when the new access node is located within the coverage of the relay stations, each of the relay stations notifies an access request sent from the new access node to a synchronization station via a report message, and the synchronization station compares the access request forwarded by each of the relay stations and the access request received by itself from the same new access node, selects a station with the best signal quality of the received access request, and implements the access of the new access node in accordance with the types of selected station and the synchronization station itself.

14 Claims, 10 Drawing Sheets

U.S. PATENT DOCUMENTS

| | | |
|---|---|---|
| 2005/0048914 A1 | 3/2005 | Sartori et al. |
| 2005/0250498 A1 | 11/2005 | Lim et al. |
| 2007/0072600 A1* | 3/2007 | Cho et al. .................. 455/423 |
| 2007/0201392 A1* | 8/2007 | Ramachandran ............ 370/315 |

FOREIGN PATENT DOCUMENTS

| | | |
|---|---|---|
| CN | 101064901 | 10/2007 |
| WO | WO-2005109689 | 11/2005 |

OTHER PUBLICATIONS

Written Opinion of the International Searching Authority, International Application No. PCT/CN2007/002732, Applicant: Huawei Technologies Co., Ltd., et al., Date of mailing: Dec. 27, 2007, 8 pages.

* cited by examiner

METHOD FOR IMPLEMENTING RANDOM ACCESS OF NEW ACCESS NODE AND COMMUNICATION SYSTEM THEREOF

CROSS-REFERENCE TO RELATED APPLICATIONS

The present application is a continuation of International Application No. PCT/CN2007/002732, filed on Sep. 17, 2007, which claims priority to Chinese Patent Application No. 200610153392.0, filed on Sep. 15, 2006, both of which are hereby incorporated by reference in their entireties.

FIELD OF THE INVENTION

The present invention relates to a field of wireless communication technologies, in particular, to a relay station technology.

BACKGROUND OF THE INVENTION

As the communication technology has developed towards personal, mobile, and broadband directions, the mobile technique, wireless technique, broadband technique, and multimedia communication technique have become critical techniques for research. In addition to the establishment and convergence of a core network, an access network is one of the bottlenecks restricting the network performance. Therefore, a broadband wireless access (BWA) technique is one of the key techniques for the development of the next generation communication networks. The access techniques may be divided into various categories according to a wired type and a wireless type, or a fixed type and a mobile type.

It is well known that, the higher the frequency is, the quicker the attenuation of the radio waves is with the changing of the distance. A high working frequency results in a quite limited coverage of a base station. Thus, by adding wireless relay stations in the network, the coverage of the system can be enlarged or the throughput of the system can be improved.

The wireless relay station communicates with the base station via an air interface, and forwards a data from a terminal. The most advantageous feature of the wireless relay station lies in that it does not need cables when being connected to the core network, so that the laying operation thereof is more flexible than that of the base station in the conventional art. Therefore, under the same system performance requirements including the coverage and throughput of the system, the cost for establishing a relay station is lower than that for establishing a base station. Thanks to the above advantageous characteristics, the relay station may be quickly laid, and the operation cost is relatively low. Therefore, by using the relay station, a larger coverage can be achieved with lower cost, and thus, the market demands for the wireless broadband access network may be increased accordingly.

Recently, a random access process of a mobile terminal is an indispensable process before mobile terminals in all the communication systems get access to the network, the random access process mainly occurs in two situations as follows. The first situation is after the mobile terminal is booted and before the connection with the network is established, and the second situation is after the mobile terminal receives a paging from the network and before the connection with the network is established once again from an idle state. However, during the process of implementing the present invention, the inventor(s) finds that, in both the above situations, the mobile terminal needs be located within the coverage of the base station, so as to implement the random access process. That is to say, if the mobile terminal is not located within the coverage of the base station, even if the mobile terminal is located within the coverage of relay stations, the random access process still cannot be implemented.

In addition to the mobile terminal, the new access node may be a newly-access relay station. Therefore, if the relay station is not within the coverage of the base station, even if the relay station is located within the coverage of other accessed relay stations, the random access process thereof still cannot be implemented.

SUMMARY OF THE INVENTION

A method for implementing a random access of a new access node and a system are provided, which enable the new access node within the coverage of relay stations to implement the random access.

An embodiment of the present invention provides a method for implementing a random access of a new access node, which includes the modules for block or process as follows.

A synchronization station receives at least one access request from a new access node directly or from at least one relay station via a report message, and the synchronization station selects a most appropriate station according to the access request received from each relay station and the access request received by itself from the same new access node.

An accessing motion of the new access node is implemented according to the station selected by the synchronization station and types of the synchronization station.

A wireless communication system is provided, which includes at least one new access node, at least one relay station, and at least one synchronization station. The relay station includes: a forwarding module, adapted to notify an access request received from a new access node to the synchronization station via a report message.

The synchronization station includes: means for receiving an access request from a new access node directly or from the at least one relay station via a reporting message, and a selection module, adapted to select a most appropriate station according to the access request; The synchronization station is configured to implement an access of the new access node according to the selected station and the synchronization station itself.

A method for implementing a random access of a new access node is provided, which includes the modules for block or process as follows.

If a signal quality of an access request from a new access node received by relay stations with high capability exceeds a preset threshold, the relay stations with high capability allocate to the new access node a bandwidth for sending a ranging request message, and send the ranging request message from the new access node to a base station.

The base station interacts with the new access mode via the relay stations with high capability, so as to implement an access of the new access node.

It may be found that when the new access node is located within the coverage of at least one relay station, the at least one relay station notifies the access request sent from the new access node to the synchronization station via the report message. The synchronization station selects a most appropriate station according to the access request received directly or via at least one relay station, so as to implement the access of the new access node, so that the new access node within the coverage of the relay stations can implement the random access to channels, thereby sufficiently utilizing the advantages brought by the relay stations to the system.

BRIEF DESCRIPTION OF THE DRAWINGS

The present invention becomes more fully understood from the detailed description given herein below for illustration only and by referring to the accompanying drawings among which.

DETAILED DESCRIPTION OF THE EMBODIMENTS

Figure 1:
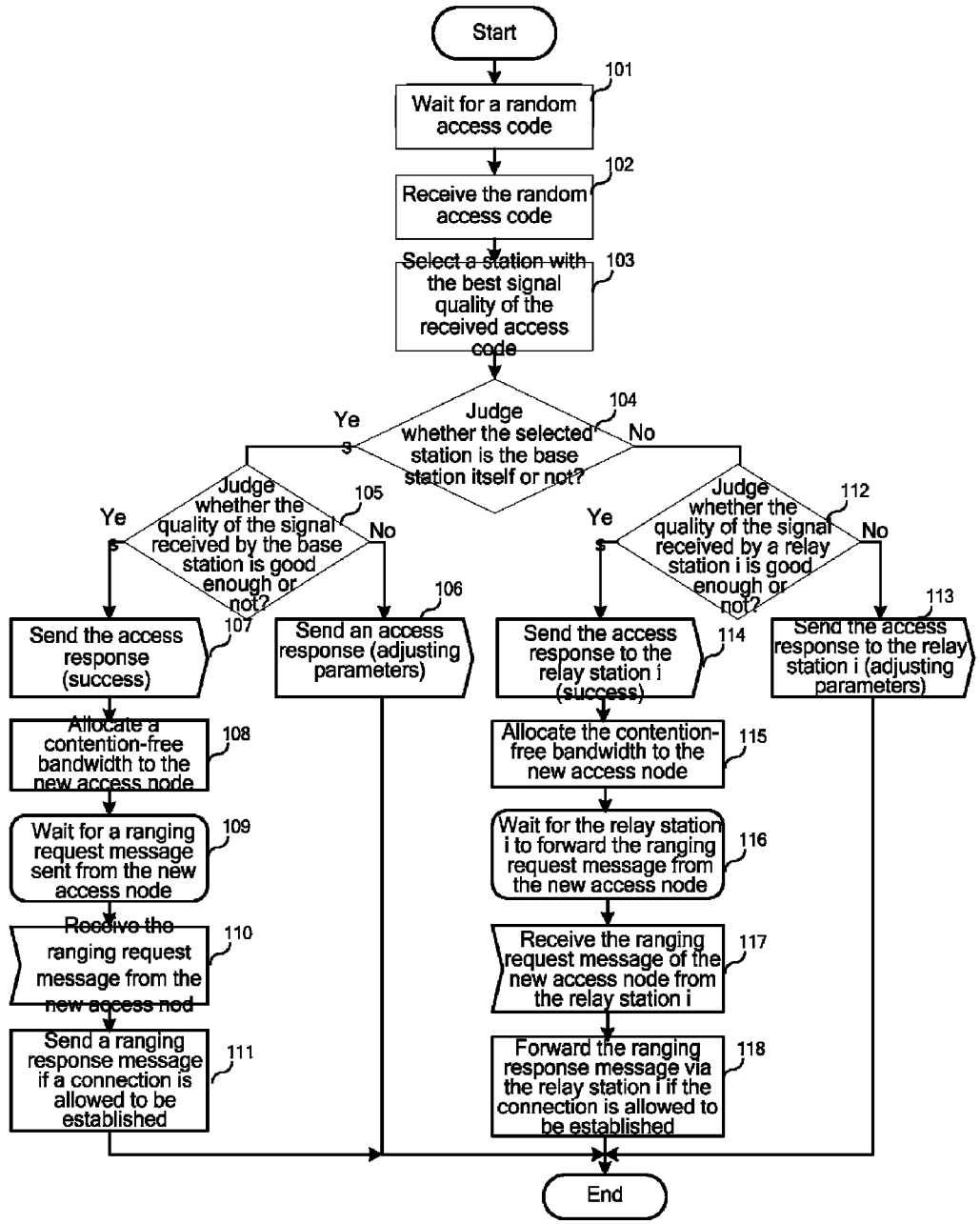
FIG. 1 is a flow chart of a processing performed by a base station in a method for implementing a random access of a new access node according to a first embodiment of the present invention.

In an embodiment of the present invention, a new access node sends an access request in an access channel with a certain transmitted power, and upon receiving the access request, each relay station with low capability forwards the access request to a synchronization station via a ranging code report message. A relay station with high capability and a base station have functions of allocating wireless resources, sending broadcasting management messages, and synchronizing signals, so as to keep synchronization with the new access node, so that the relay station with high capability or the base station can serve as a synchronization station. The synchronization station selects a station with a best signal quality from the stations (including the synchronization station itself and each relay station with low capability) receiving the access request signal from the same new access node. If the selected station is a relay station with low capability, and the synchronization station is a base station, the base station interacts with the new access node via the relay station with low capability, so as to implement an access of the new access node. If the selected station is the synchronization station itself, and the synchronization station is the base station, the base station directly interacts with the new access node, so as to implement the access of the new access node. If the synchronization station is a relay station with high capability, and the station selected by the relay station with high capability is the relay station with low capability, the base station interacts with the new access node via the relay station with high capability and the relay station with low capability, so as to implement the access of the new access node. If the synchronization station is the relay station with high capability, and the station selected by the relay station with high capability is the relay station with high capability itself, the base station interacts with the new access node via the relay station with high capability, so as to implement the access of the new access node. The new access node may be a relay station or a mobile terminal.

Under a situation that the relay station with low capability does not exist but only the base station, the relay station with high capability, and the new access node exist, if the signal quality of the access request from the new access node received by the relay station with high capability is sufficiently high, the relay station with high capability allocates to the new access node a bandwidth for sending a ranging request message, and sends the ranging request message from the new access node to the base station, and the base station interacts with the new access node via the relay station with high capability, so as to implement the access of the new access node. In this manner, the new access node within the coverage of the relay station is enabled to implement the random access.

In the solution of the present invention, the new access node within a coverage of a cell may receive all the broadcasting information, and the broadcasting information may be directly sent from the base station, or the same broadcasting information may be sent from the base station and the relay station with low capability in the same time frequency resource. In this case, the information received by the new access node is a superposition of a broadcasting signal sent from the base station and that sent from the relay station with low capability at the same time.

A detailed description of a first embodiment of the present invention is given as follows. In this embodiment, a method for implementing a random access of a new access node is provided. In this embodiment, each relay station is a relay station with low capability capable of sending a downlink broadcasting message, the synchronization station is a base station, and no relay stations with high capability exist in a transferring link from the new access node to the base station.

The processing flows of the base station and the relay station with low capability in this embodiment are respectively described as follows, and the processing flow of the base station is shown in FIG. 1.

At module for block or process 101, the base station waits for a random access code (the access request). Particularly, if the new access node needs to initiate the random access, the new access node scans downlink synchronization information, and establishes synchronization with the base station or the relay station with low capability, so as to acquire uplink and downlink channel parameters from the broadcasting message. Then, the new access node sends the access code, that is, sends an initial ranging code in the access channel with a certain transmitted power.

In this embodiment, the relay stations with low capability are completely synchronous with the base station and respectively communicate with the base station and the new access node in a time division duplex (TDD) manner. The relay stations with low capability are uniformly coordinated by the base station which the relay stations with low capability belong to, and the relay stations with low capability do not have a final decision-making authority. In order to support the relay station with low capability, a downlink sub-frame and an uplink sub-frame of the base station are both divided into two parts. For the downlink sub-frame, one part is called a downlink terminal sub-frame, which is used to provide services to the new access node, and the other part is called a downlink relay sub-frame, which is used to provide services to the relay station with low capability. Similarly, the uplink sub-frame is divided into an uplink terminal sub-frame and an uplink relay sub-frame. The new access node within the coverage of a cell may receive all the broadcasting information, in which the broadcasting information may be directly sent from the base station, or the same broadcasting information may be sent from the base station and the relay station with low capability in the same time frequency resource. In this case, the information received by the new access node is a superposition of a broadcasting signal sent from the base station and that sent from the relay station with low capability at the same time.

Figure 2:
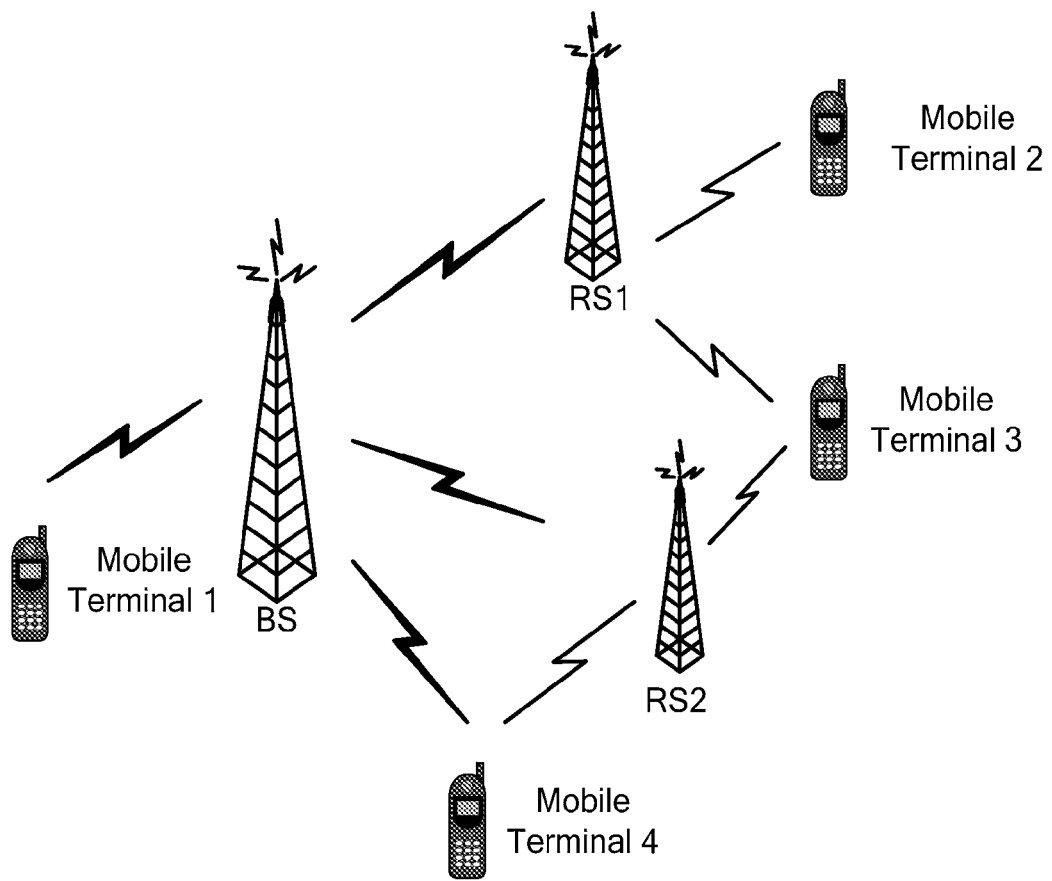
FIG. 2 is a schematic view of a relation between a new access mode and a base station in the method for implementing the random access of the new access node according to the first embodiment of the present invention.

At module for block or process 102, the base station receives the random access code. Particularly, the relations among the new access node, the base station, and the relay station with low capability may be divided into four situations as follows. As shown in FIG. 2, the new access node is, for example, a mobile terminal for making descriptions.
(1) A signal transmitted from the mobile terminal is only received by the base station, but fails to be received by other relay stations with low capability, for example, the mobile terminal 1.
(2) The signal transmitted from the mobile terminal is only received by one relay station with low capability, but fails to be received by the base station, for example, the mobile terminal 2.
(3) The signal transmitted from the mobile terminal is only received by two or more relay stations with low capability, but fails to be received by the base station, for example, the mobile terminal 3.
(4) The signal transmitted from the mobile terminal is received by one or more relay stations with low capability and also received by the base station, for example, the mobile terminal 4.

When the new access node is a relay station, the relations may also be divided into the above four situations.

Therefore, the access code sent from the new access node may be received by the base station, one relay station with low capability, two or more relay stations with low capability, or received by both the relay station with low capability and the base station.

In this embodiment, if each relay station with low capability receives the access code from the new access node, the relay station with low capability respectively forwards the access code received from the new access node to the base station via a ranging code report message. The ranging code report message includes parameters of an access signal, for example, a received signal intensity parameter (for example, an average power or a signal noise ratio) P, a carrier frequency difference $\Delta f$ of the new access node with respect to the relay station with low capability, and a time synchronization difference $\Delta T$ of the new access node with respect to the relay station with low capability.

The report message sent from each relay station with low capability includes the parameters of the access signal, so that the report message may be considered as the ranging code report message, and the format thereof is shown in Table 1.

TABLE 1

| Syntax | Size | Remarks |
| --- | --- | --- |
| RNG-COD-REP_Message_Format { | | |
| Message Type | 8 Bit | Message type |
| No. Request | 8 Bit | Number of received ranging codes |
| For( i=0: i<No. Request; i++) { | | |
| TLV encodings | Variable | Variable parameter encoding |
| } } | | |

The format of the variable parameter encoding in the ranging code report message is shown in Table 2.

TABLE 2

| Type | Length | Descriptions | Value |
| --- | --- | --- | --- |
| 150 | 4 | Ranging code attributes | Bit #31-22: OFDM time symble reference of the received ranging code<br>Bit #21-16: OFDMA subchannel reference of the received ranging code<br>Bit #15-8: Ranging code index of the received ranging code<br>Bit #7-0: The 8 LSB of the frame number where the ranging code is received |
| 1 | 4 | Timing difference | Timing difference between the RS and the SS (signed 32-bit, in PS) |
| 2 | 4 | Frequency difference | Frequency difference between the RS and the SS (signed 32-bit, in Hz) |
| 3 | 2 | Received power | Received power of the ranging code |

After receiving the access code from the new access node, each relay station with low capability firstly judges whether the signal quality of the access code exceeds a preset threshold or not, and if yes, the relay station with low capability forwards the access code to the base station; otherwise, the access code is ignored.

At module for block or process 103, the base station selects a station with a best signal quality of the received access code. Particularly, according to evaluation indexes for the signal quality, the base station selects the station with the best signal quality of the received access code according to the access code forwarded by each relay station with low capability via the report message and the access code received by the base station itself from the same new access node. For example, the evaluation indexes for the signal quality include the received signal intensity parameter (for example, the average power or the signal noise ratio) P, the carrier frequency difference $\Delta f$ of the new access node with respect to the relay station with low capability, and the time synchronization difference $\Delta T$ of the new access node with respect to the relay station with low capability. The ranging code report message sent from each relay station with low capability includes relevant parameters P, $\Delta f$, and $\Delta T$, so that the base station may respectively compute $|\Delta f_i \cdot \Delta T_i|/P_i$, selects a station with a minimum $|\Delta f_i \cdot \Delta T_i|/P_i$ value as the station with the best signal quality, in which, i=0, 1, . . . k, and k is a number of the relay stations with low capability for forwarding the access code. An access code corresponding to the $|\Delta f_0 \cdot \Delta T_0|/P_0$ is the access code received by the base station itself, $P_0 = P^{BS} + P\_Offset$, $P^{BS}$ is a signal intensity of the access code, P_Offset is a fixed parameter greater than 0, $\Delta f_0$ is a carrier frequency difference of an access node with respect to the base station, $\Delta T_0$ is a time synchronization difference of the access node with respect to the base station, and when i is not equal to 0, $P_i$ is a signal intensity of an access code received by the $i^{th}$ relay station with low capability, $\Delta f_i$ is a carrier frequency difference of the access node with respect to the $i^{th}$ relay station with low capability, and $\Delta T_i$ is a time synchronization difference of the access node with respect to the $i^{th}$ relay station with low capability. The above algorithms guarantee that the base station can select the station with the best signal quality of the received access code.

In addition, after receiving the access code from the new access node, the relay stations with low capability firstly judge whether the signal quality of the access code exceeds the preset threshold or not, and if yes, the relay stations with low capability forward the access code to the base station via the report message, so as to save the system resources in the base station.

At module for block or process 104, it is judged whether the selected station is the base station itself. Particularly, after selecting the station with the best signal quality of the received access code from the stations (including the synchronization station itself and each relay station with low capability) for receiving the access code from the same new access node according to the evaluation indexes for the signal quality, the base station judges whether the selected station is the base station itself or not, and if yes, module for block or process 105 is performed; otherwise, module for block or process 112 is performed.

At module for block or process 105, the base station judges whether parameters of a terminal that sends the access code are good enough or not. Particularly, if yes, module for block or process 107 is performed, otherwise, module for block or process 106 is performed, in which the base station sends an access response message carrying adjusting parameters to the new access node, so that the new access node may adjust the signal parameters thereof (including the transmitted power) according to the response message and then send the access code once again. Then, the base station waits for the new access node to send a random access code again. If the base station judges that the signal quality of the access code is sufficiently high, module for block or process is performed.

At module for block or process 107, the base station sends an access response message carrying success information to the new access node, which represents that the parameters of the terminal have been adjusted to be good enough.

At module for block or process 108, the base station allocates a contention-free time frequency resource to the new access node, so that the new access node sends a ranging request message (Ranging-Request).

At module for block or process 109, the base station waits for the new access node to send the ranging request message.

At module for block or process 110, the base station receives the ranging request message sent from the new access node in the time frequency resource allocated by the base station.

At module for block or process 111, the base station sends a corresponding response message, that is, a ranging response message (Ranging-Response).

If the station with the best signal quality selected by the base station from the stations (including the synchronization station and each relay station with low capability) for receiving the access code from the same new access node based on the evaluation indexes for the signal quality is not the base station itself, but is the relay station with low capability, module for block or process 112 is performed.

At module for block or process 112 is performed, the base station judges whether the signal quality of the access code forwarded by the selected relay station with low capability via the report message is sufficiently high or not. Particularly, if yes, module for block or process 114 is performed, otherwise, module for block or process 113 is performed, in which the base station sends the response message carrying the adjusting parameters to each relay station with low capability, and each relay station with low capability forwards the response message carrying the adjusting parameters to the new access node, so that the new access node adjusts the signal parameters thereof (including the transmitted power) according to the response message and sends the access code once again. Then, the base station waits for the new access node to send a random access code again. Accordingly, the base station adjusts parameters of the new access node adapted to get access to a channel according to the parameter of the relay station with low capability, so as to ensure the new access node to successfully get access to the channel. If the base station judges that the signal quality of the access code is sufficiently high, module for block or process 114 is performed.

At module for block or process 114, the base station sends the ranging response carrying success information to each relay station with low capability, and each relay station with low capability forwards the ranging response carrying the success information to the new access node, which represents that it is allowed to establish a connection between the new access node and the base station.

At module for block or process 115, the base station allocates the contention-free time frequency resource to the new access node, so that the new access node sends the ranging request message.

At module for block or process 116, the base station waits for the ranging request message sent from the new access node and forwarded by each relay station with low capability.

At module for block or process 117, the base station receives the ranging request message sent from the new access node in the time frequency resource allocated by the base station via the relay station with low capability.

At module for block or process 118, the base station forwards a corresponding ranging response message to the new access node via the relay station with low capability. In this manner, the new access node within the coverage of the relay station with low capability is enabled to randomly get access to the channel, thereby sufficiently utilizing the advantages brought by the relay station with low capability to the system.

Figure 3:
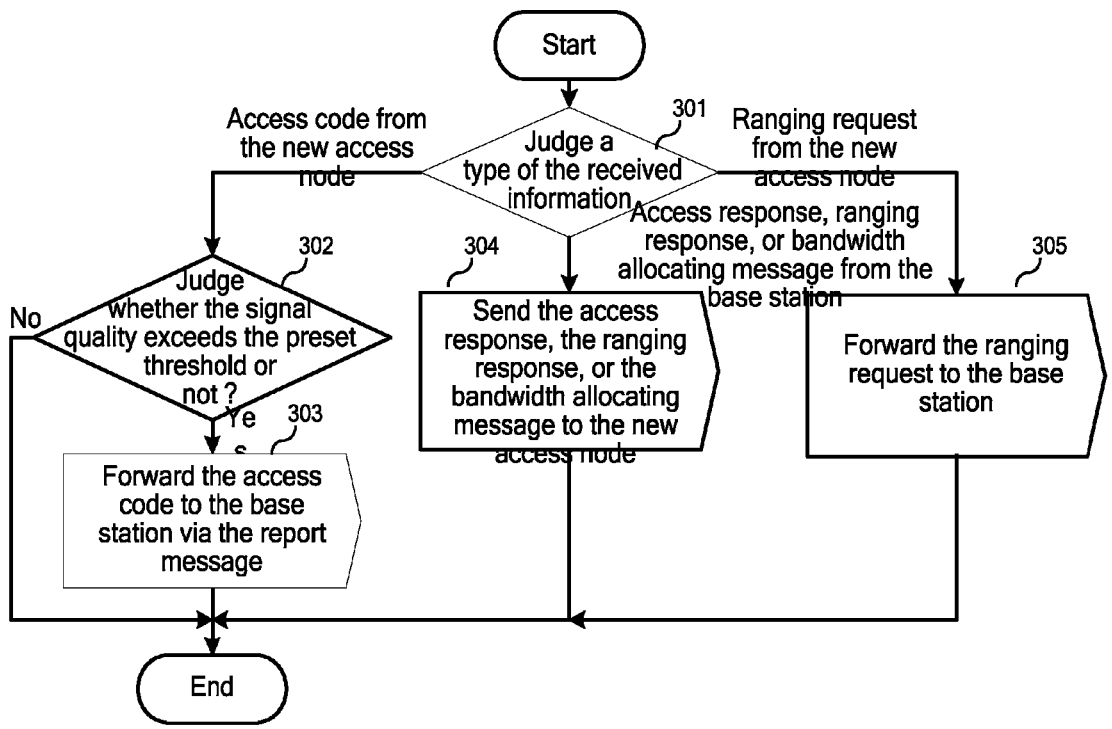
FIG. 3 is a flow chart of a processing performed by a relay station with low capability in the method for implementing the random access of the new access node according to the first embodiment of the present invention.

The processing flow of the relay station with low capability in this embodiment is shown in FIG. 3.

At module for block or process 301, the relay station with low capability judges a type of received information. Particularly, if the new access node is located within the coverage of the relay station with low capability, when the new access node sends the access code (the initial ranging code), the relay station with low capability receives the initial ranging code sent from the new access node. If the relay station with low capability is the station with the best signal quality among all the stations that receive the signal from the same new access node, the relay station with low capability receives the access response message carrying the adjusting parameters or the success information sent from the base station. If the relay station with low capability receives an access code signal, the relay station with low capability further receives a bandwidth allocating message carrying the contention-free time frequency resource information sent from the base station. If the base station receives the ranging request message from the new access node via the relay station with low capability, the relay station with low capability receives the ranging response message from the base station. If the relay station with low capability is the station with the best signal quality among all the stations that receive the signal from the same new access node, and the base station has already allocated to the new access node the contention-free time frequency resource adapted to send information required for establishing a connection, the relay station with low capability receives the ranging request message sent from the new access node. Therefore, when receiving the information, the relay station with low capability firstly judges the type of the received information.

If the information is the access code from the new access node, module for block or process 302 is performed. If the information is the access response message, the bandwidth allocating message carrying the contention-free time frequency resource information, or the ranging response message from the base station, module for block or process 304 is performed. If the information is the ranging request message from the new access node, module for block or process 305 is performed.

At module for block or process 302, when receiving the access code from the new access node, the relay station with low capability judges whether the signal quality of the access code exceeds the preset threshold or not. The evaluation indexes for the signal quality of the access code adopted by the relay station with low capability include the signal intensity, the time synchronization difference of the signal with respect to the relay station with low capability, and the carrier frequency difference of the signal with respect to the relay station with low capability. If the signal quality of the access code exceeds the preset threshold, module for block or process 303 is performed, in which the relay station with low capability forwards the access code to the base station via the report message, and the report message includes the received signal intensity parameter P, the carrier frequency difference $\Delta f$ of the new access node with respect to the relay station with low capability, the time synchronization difference $\Delta T$ of the new access node with respect to the relay station with low capability and the like, which provides a reliable reference for the base station to select the station with the best signal quality of the access code received from the new access node.

When the relay station with low capability receives the access response message (for example, the access response message carrying the adjusting parameters or the access response message carrying the success information), the bandwidth allocating message carrying the contention-free time frequency resource information, or the ranging response message from the base station, module for block or process 304 is performed, in which the message is sent to the new access node. The relay station with low capability sends the access response message carrying the adjusting parameters to the new access node, so that the new access node adjust the signal parameters (including the transmitted power) thereof according to the response message and then initiates the access code once again. The relay station with low capability sends the access response message, the bandwidth allocating message, or the ranging response message to the new access node, so as to ensure the new access node to successfully get access to the channel via the relay station with low capability.

When the relay station with low capability receives the ranging request message from the new access node, module for block or process 305 is performed, in which the relay station with low capability forwards the ranging request message to the base station, so as to establish the connection between the new access node and the base station.

For example, the system is a worldwide interoperability for microwave access (WiMAX) system, and the station with the best signal quality of the access code selected according to the access code received from each relay station and the access code received by the base station itself from the same new access node is the base station itself, and thus, the descriptions of the random access flow of the new access node in this embodiment are given as follows.

Figure 4:
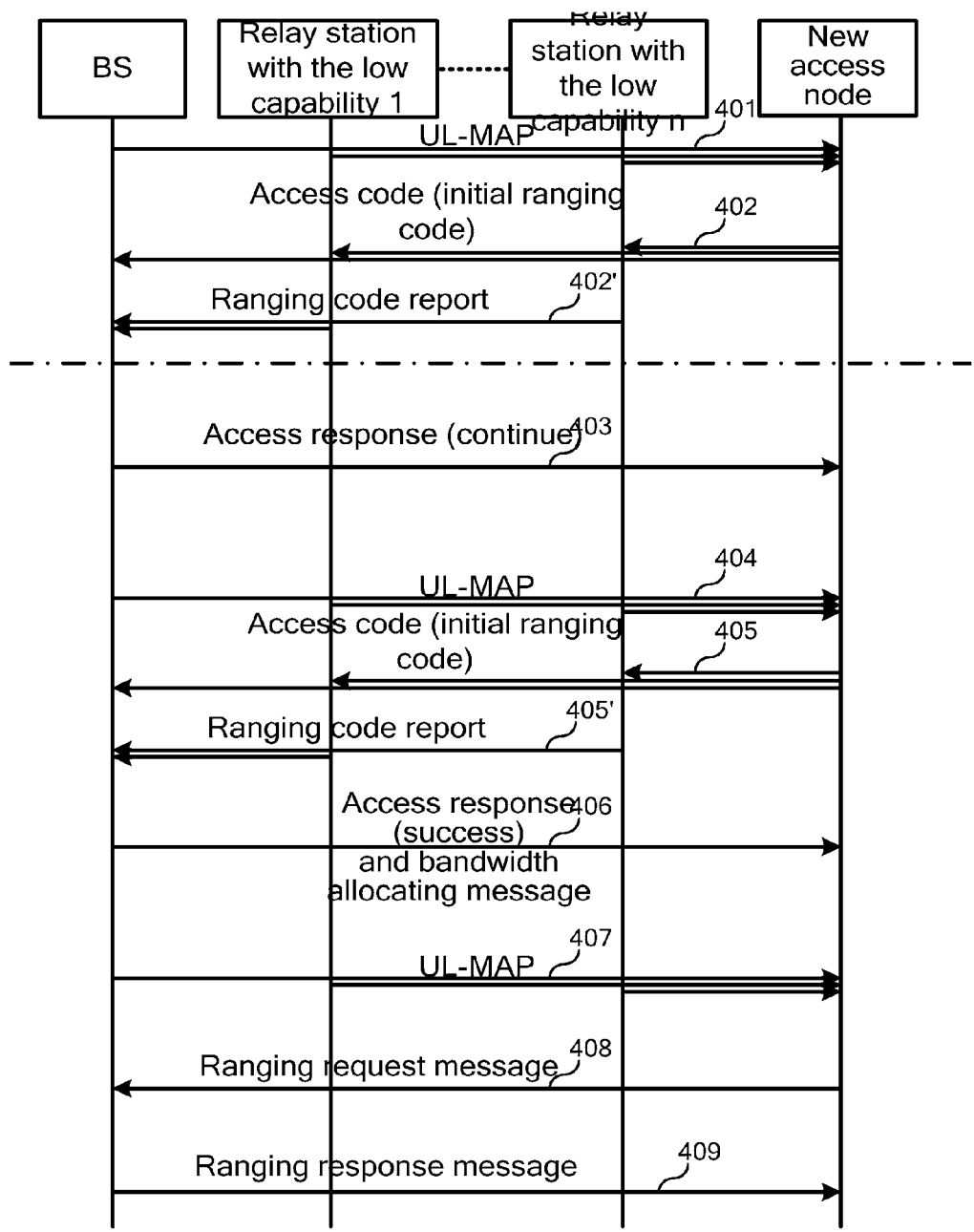
FIG. 4 is a flow chart of the method for implementing the random access of the new access node according to the first embodiment of the present invention when a station with a best signal quality of a received access code is the base station itself.

As shown in FIG. 4, at module for block or process 401, when the time for a code division multiple access (CDMA) initial ranging opportunity is reached, the base station sends a "UL-MAP" message in a frame header, and the message includes time frequency resource allocating information for ranging. If the new access node is located within a transferring scope of the message, the message may be directly transferred to the new access node. If any relay station with low capability exists within the transferring scope of the message, and the relay station with low capability sends a sense the same as the base station, the base station sends the message to the relay station with low capability in advance, so that the relay station with low capability sends the message in the same time frequency resource with the base station. The new access node scans downlink synchronization information, establishes synchronization with the base station or the relay station with low capability, and then acquires uplink and downlink channel parameters from the broadcasting message.

At module for block or process 402, the new access node decodes the "UL-MAP" message, and when the ranging opportunity is reached, the new access node randomly selects a code from a ranging code set, and sends the code in a ranging time slot in a ranging sub-channel, that is, sends the access code, i.e., initial ranging code, and then starts a T3 timer, and waits for the access response message, in which if the timer overflows, corresponding overflow processing is performed.

The new access node may be a mobile terminal or a relay station, so that the mobile terminal and the relay station within the coverage of the relay stations are enabled to successfully implement the access. The initial ranging codes sent from the mobile terminal or the relay station serving as the new access node may be distributed in different intervals, so as to reduce a possibility of a conflict between the relay station and the mobile terminal, and to lower an average access time of the relay station. If a collision occurs during the ranging, and no access response message is received within the time regulated in the protocol, the new access node repeatedly sends the initial ranging code according to a compromise policy regulated in the protocol till certain times are reached.

If any relay station with low capability exists in the transferring scope of the access code signal, module for block or process 402' is entered, in which the relay station with low capability receives the access code, and then generates and sends the ranging code report message of the access code to the base station, and the message carries the received signal intensity parameter (for example, the average power or the signal noise ratio) P, the carrier frequency difference $\Delta f$ of the new access node with respect to the relay station with low capability, and the time synchronization difference $\Delta T$ of the new access node with respect to the relay station with low capability. The format of the message has been described in the processing flow of the base station, so it is not repeatedly described here. Various parameters (including the ranging code, a sending position of the ranging code, a adjusting amount of the ranging code indicated by the relay station with low capability after receiving and judging the ranging code, and the like) carried in the ranging code report message provide the reliable reference for the base station to select the station with the best signal quality of the received access code. Definitely, there may be more than one relay station with low capability, and accordingly, each relay station with low capability needs to execute the above module.

Upon receiving the access code from the new access node, each relay station with low capability judges whether the signal quality of the access code exceeds the preset threshold or not, and if yes, each relay station with low capability generates and sends the ranging code report message to the base station; otherwise, the access code is ignored. In this manner, stations with poor signal quality of the received access code do not need to send the access code report message, thereby saving the system resource in the base station.

At module for block or process 403, the base station collects the access code received by the base station itself and the access code forwarded by each relay station with low capability via the report message from the same new access node, and sends the access response message. Particularly, the base station waits for a period of time after receiving the access code from the new access node by the base station itself, and if no ranging code report message about the new access node sent from each relay station with low capability is received within the period of time, the base station takes itself as the station with the best signal quality of the received access code; otherwise, the base station selects one station with the best signal quality of the received access code according to a selecting algorithm. The detailed selecting algorithm has been described in the processing flow of the base station, so it is not repeatedly described here. In this embodiment, the selected station is the base station itself. Therefore, the base station directly sends the ranging response message to the new access node. In this embodiment, a ranging state message in the access response message in this module is "Continue". That is to say, the access response message carries certain adjusting parameters, and requests the new access node to adjust the signal parameters (including the transmitted power) thereof according to the response message and to send the access code once again.

At module for block or process 404, when the time of the opportunity for sending the CDMA ranging is reached, the base station sends the "UL-MAP" message in the frame header, in which the message carries the time frequency resource allocating information for ranging. The module 404 is substantially similar to the module 401.

At module for block or processes 405 and 405' are respectively the same as the modules 402 and 402', which thus are not described here.

At module for block or process 406, upon receiving the access code sent from the new access node after the new access node has adjusted the signal parameters (including the transmitted power) thereof, the base station sends the access response message to the new access node once again. If the signal quality of the access code received by the base station this time is sufficiently high, the ranging state message in the access response message sent this time is "Success", that is to say, the access response message carrying the success information is sent. Furthermore, the base station allocates the contention-free bandwidth to the new access node via the bandwidth allocating message (CDMA_Allocation_IE), in which the contention-free bandwidth is for sending the ranging request message by the new access node.

At module for block or process 407, when the time of the opportunity for sending the CDMA ranging is reached, the base station carries the time frequency resource allocating information for ranging in the sent "UL-MAP" message.

At module for block or process 408, after receiving the allocated contention-free time frequency resource information, the new access node sends the ranging request message carrying a medium access control (MAC) address of the new access node in the specified contention-free time frequency resource.

At module for block or process 409, after receiving the ranging request message sent from the new access node, the base station generates a response message, i.e., the ranging response message, carrying a connection ID (CID) allocated to the new access node and other information, and sends the ranging response message to the new access node.

For example, the system is the WiMAX system, the station with the best signal quality among the stations (including the base station and each relay station with low capability) that receive the access code signal from the same new access node is the relay station with low capability, and the relay station with low capability can send the broadcasting message, and thus, the descriptions of the random access flow of the new access node in this embodiment are given as follows.

Figure 5:
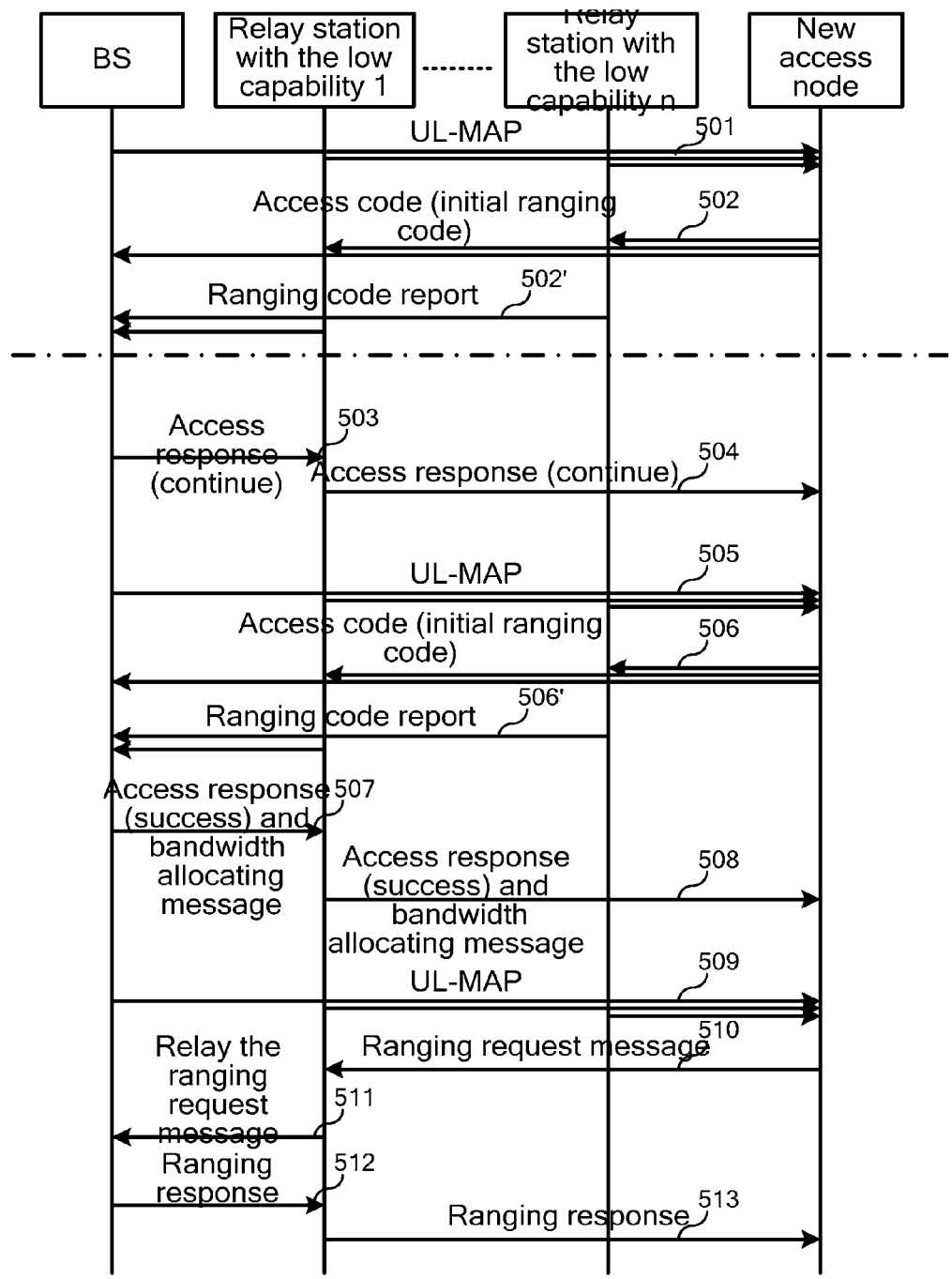
FIG. 5 is a flow chart of the method for implementing the random access of the new access node according to the first embodiment of the present invention when the station with the best signal quality of the received access code is the relay station with low capability.

As shown in FIG. 5, at module for block or process 501, when the time for the CDMA initial ranging opportunity is reached, the base station carries the time frequency resource allocating information for ranging in the sent "UL-MAP" message. This module is substantially same as the module for block or process 401, detailed description is omitted here.

At module for block or process 502, the new access node decodes the "UL-MAP" message, randomly selects a code from the ranging code set, and sends the code in the ranging time slot in the ranging sub-channel, that is, sends the access code, i.e., initial ranging code, and then starts the T3 timer, and waits for the access response message, in which if the timer overflows, corresponding overflow processing is performed. This module is substantially the same as the module 402

If any relay station with low capability exists within the transferring scope of the access code, module for block or process 502' is performed, and the module 502' is substantially same as the module 402', so it is not repeatedly described here.

At module for block or process 503, the base station collects the access code received by the base station itself and the access code forwarded by each relay station with low capability via the report message from the same new access node, and sends the ranging response message after selecting the station with the best signal quality of the received access code. The module 503 is substantially similar to the module 403, and the difference there-between lies in that, at the module 403, the station with the best signal quality of the received access code selected by the base station is the base station itself, and in the module 503, the station with the best signal quality of the received access code selected by the base station is a relay station with low capability 1. The relay station with low capability in this embodiment can send the broadcasting message, so the base station sends the ranging response message to the relay station with low capability 1. (If the relay station with low capability cannot send the broadcasting message, the access response message may be directly broadcasted by the base station). It is assumed that the signal quality of the access code received by the selected station is still not desirable, so that a ranging state in the access response message is "Continue". Thus, the base station instructs to adjust the parameters of the new access node adapted to get access to the channel according to the parameters of the relay station with low capability 1, so as to ensure the new access node to successfully get access to the channel.

At module for block or process 504, the relay station with low capability 1 forwards the access response message carrying the adjusting parameters received from the base station to the new access node, so that the new access node adjusts the signal parameters (including the transmitted power) thereof according to the response message, and then sends the access code once again.

At module for block or process 505, when the time of the opportunity for sending the CDMA ranging is reached, the base station carries the time frequency resource allocating information for ranging in the sent "UL-MAP" message. This module is the substantially similar to the module 501.

At module for block or processes 506 and 506' are respectively the same as the modules 502 and 502', which thus are not repeatedly described here.

At module for block or process 507, the base station collects the access code received by the base station itself and the access code forwarded by each relay station with low capability via the report message from the same new access node, and sends the access response message after selecting the station with the best signal quality of the received access code. The module 507 is substantially similar to the module 503, but the difference there-between lies in that, in the module 503, the signal quality of the access code received by the station selected by the base station is not desirable; in the module 507, the signal quality of the access code received by the station selected by the base station is sufficiently high. Thus, the ranging state of the access response message sent from the base station to the relay station with low capability 1 is "Success". Furthermore, the base station allocates the contention-free bandwidth to the new access node via the bandwidth allocating message (CDMA_Allocation_IE), in which the contention-free bandwidth is for sending the ranging request message by the new access node. The base station directly sends the bandwidth allocating message to the new access node, or the base station sends the bandwidth allocating message to the new access node via the relay station with low capability 1.

At module for block or process 508, the relay station with low capability 1 forwards the ranging response message carrying the success information received from the base station to the new access node, so as to notify the new access node to send the ranging request message.

At module for block or process 509, when the time of opportunity for sending the CDMA ranging is reached, the base station sends the "UL-MAP" message carrying the time frequency resource allocating information for ranging once again.

At module for block or process 510, after receiving the allocated contention-free time frequency resource information, the new access node sends the ranging request message carrying the MAC address of the new access node in the allocated contention-free time frequency resource. The ranging request message is forwarded to the base station via the relay station with low capability 1, and thus in this module, the relay station with low capability 1 receives the ranging request message.

At module for block or process 511, the relay station with low capability 1 forwards the ranging request message to the base station.

At module for block or process 512, after receiving the ranging request message from the new access node forwarded via the relay station with low capability 1, the base station generates a response message, i.e., the ranging response message, which carries the CID allocated to the new access node and other information. The ranging response message needs to be forwarded to the new access node via the relay station with low capability 1. Therefore, in this module, the base station sends the ranging response message to the relay station with low capability 1.

At module for block or process 513, the relay station with low capability 1 forwards the ranging response message to the new access node.

Thus, even if the new access node is not located within the coverage of the base station, the new access node can also implement the random access process as long as it is located within the coverage of the relay station.

If the relay station with low capability needs to send the access code received from the new access node to the base station via the report message through other relay stations with low capability, and the relay station with low capability is the station with the best signal quality of the received access code, the base station interacts with the new access node via the forwarding of a plurality of relay stations with low capability, so as to implement the access of the new access node. That is to say, this embodiment is not only applicable to a double-hop system, but also applicable to a multi-hop system.

Figure 6:
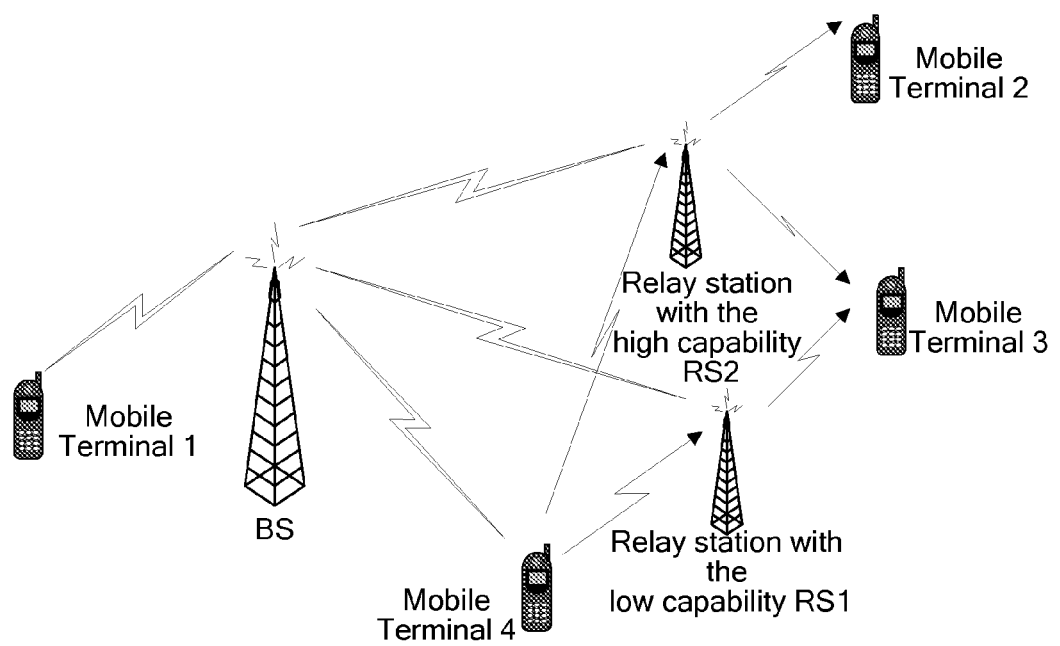
FIG. 6 is a schematic view of a relation among the new access mode, the relay station with low capability, the relay station with high capability, and the base station according to the present invention.

The relations among the new access node, the base station, and each relay station may be classified into many situations, and thus it is possible that both a relay station with high capability (for example, RS2) and a relay station with low capability (for example, RS1) exist in the transferring link from the new access node to the base station, as shown in FIG. 6. Therefore, an uplink signal transmitted from the new access node, for example, the uplink signal transmitted from a mobile terminal 4 as the new access node, may be received by one or more relay stations with low capability, and may also be received by the synchronization station (the relay station with high capability) for the relay stations with low capability.

As for the situation that both the relay station with high capability and the relay station with low capability exist in the transferring link from the new access node to the base station, a detailed description of a second embodiment of the present invention is given as follows. In this embodiment, a method for implementing a random access of a new access node is provided. In this embodiment, the synchronization station is a relay station with high capability, and the relay station with low capability cannot send a downlink broadcasting message, which is applicable to a scenario for increasing the cell throughput. Under such a scenario, terminals located within a coverage of the relay station with low capability directly receive the downlink broadcasting information sent from the synchronization station.

Figure 7:
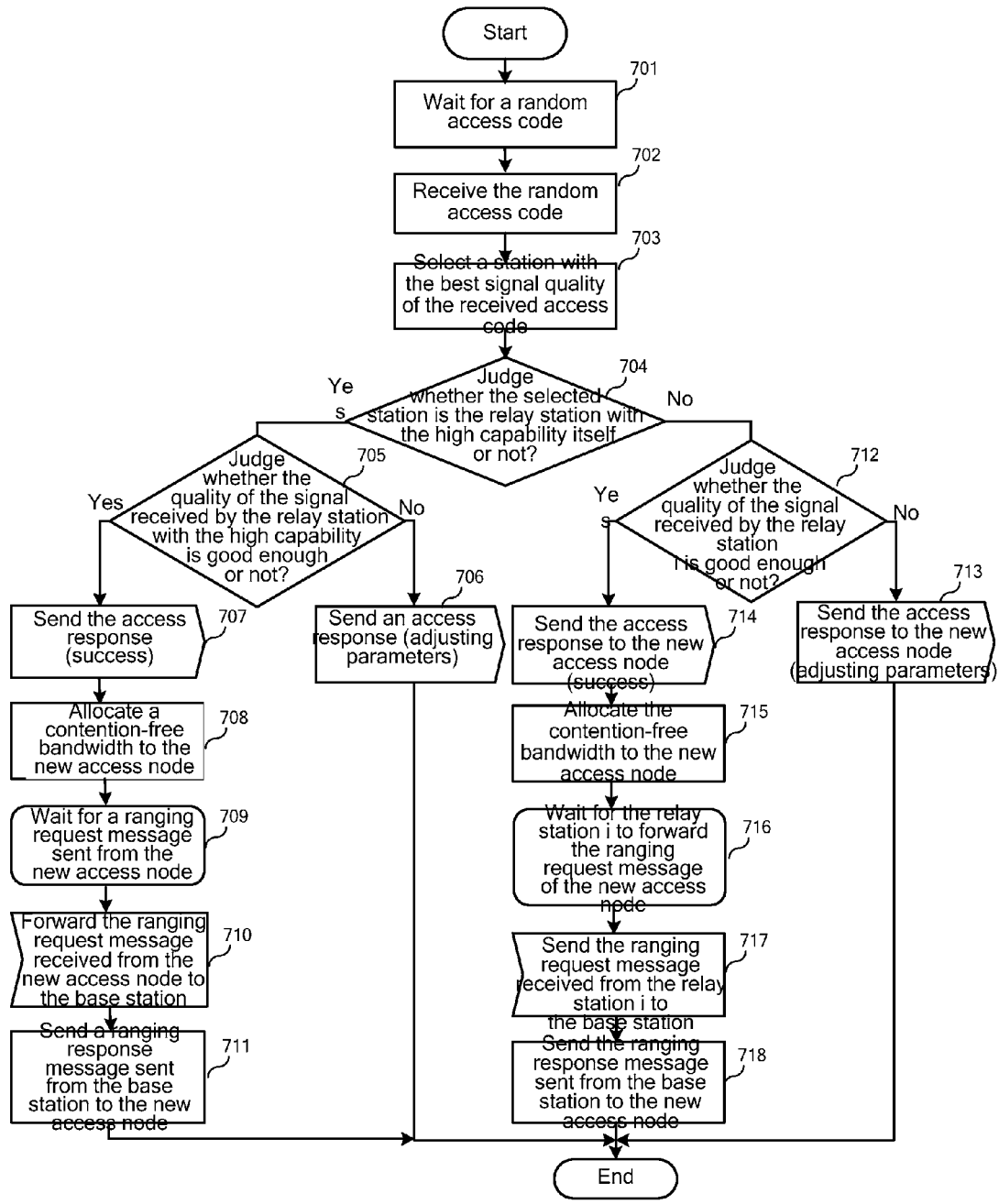
FIG. 7 is a flow chart of a processing performed by a relay station with high capability in a method for implementing a random access of a new access node according to a second embodiment of the present invention.

The processing flows of the relay station with high capability and the relay station with low capability in this embodiment are respectively described as follows, and the processing flow of the relay station with high capability is as shown in FIG. 7.

At module for block or process 701, the relay station with high capability waits for a random access code (i.e., an access request). Particularly, if the new access node needs to initiate a random access, the new access node firstly scans downlink synchronization information, and establishes synchronization with a service node, so as to acquire uplink and downlink channel parameters. Among the uplink parameters, a ranging code set and a ranging region position in an uplink frame need to be acquired.

Modules for block or process 702 to 709 are substantially similar to the Modules 102 to 109 of the first embodiment respectively, but the difference there-between lies in that, in the first embodiment, the base station selects the station with the best signal quality of the received access code and returns the access response message, but in this embodiment, the relay station with high capability selects the station with the best signal quality of the received access code, and returns the access response message. Furthermore, when the signal quality of the received access code is sufficiently high, the relay station with high capability allocates a contention-free time frequency resource to the new access node.

After acquiring the allocated contention-free time frequency resource, the new access node sends a ranging request message, and requests to establish a connection with a base station. At module for block or process 710, the relay station with high capability encapsulates the ranging request message received from the new access node with a basic CID of the relay station with high capability itself, and forwards the ranging request message to the base station. After receiving the forwarded ranging request, the base station extracts ranging request message parameters sent from the new access node, and then generates a ranging response message. Under the situation that the station with the best signal quality of the received access code is the relay station with high capability, the ranging response message is forwarded to the new access node via the relay station with high capability.

At module for block or process 711, the relay station with high capability extracts a corresponding ranging response message from the ranging response message received from the base station, and sends the ranging response message to the new access node with an initial CID (i.e., CID=0).

Modules for block or process 712 to 716 are substantially similar to the modules 112 to 116 of the first embodiment respectively, and the difference there-between lies in that, in the first embodiment, when the station with the best signal quality of the received access code is the relay station with low capability, the base station returns the access response message to the new access node via the relay station with low capability; in this embodiment, when the station with the best signal quality of the received access code is the relay station with low capability, the relay station with high capability directly returns the access response message (in this embodiment, the relay station with low capability cannot send a downlink broadcasting message) to the new access node. Furthermore, when the signal quality of the received access code is sufficiently high, the relay station with high capability allocates the contention-free time frequency resource to the new access node.

After acquiring the allocated contention-free time frequency resource, the new access node sends the ranging request message, and requests to establish the connection with the base station. At module for block or process 717, the relay station with high capability encapsulates the ranging request message received from the new access node and forwarded via the relay station with low capability with the basic CID of the relay station with high capability itself, and forwards the ranging request message to the base station. After receiving the forwarded ranging request, the base station extracts ranging request message parameters sent from the new access node, and then generates the ranging response message. The ranging response message is forwarded to the new access node via the relay station with high capability.

At module for block or process 718, the relay station with high capability extracts the corresponding ranging response message from the ranging response message received from the base station, and sends the ranging response message to the new access node with an initial CID (i.e., CID=0).

Figure 8:
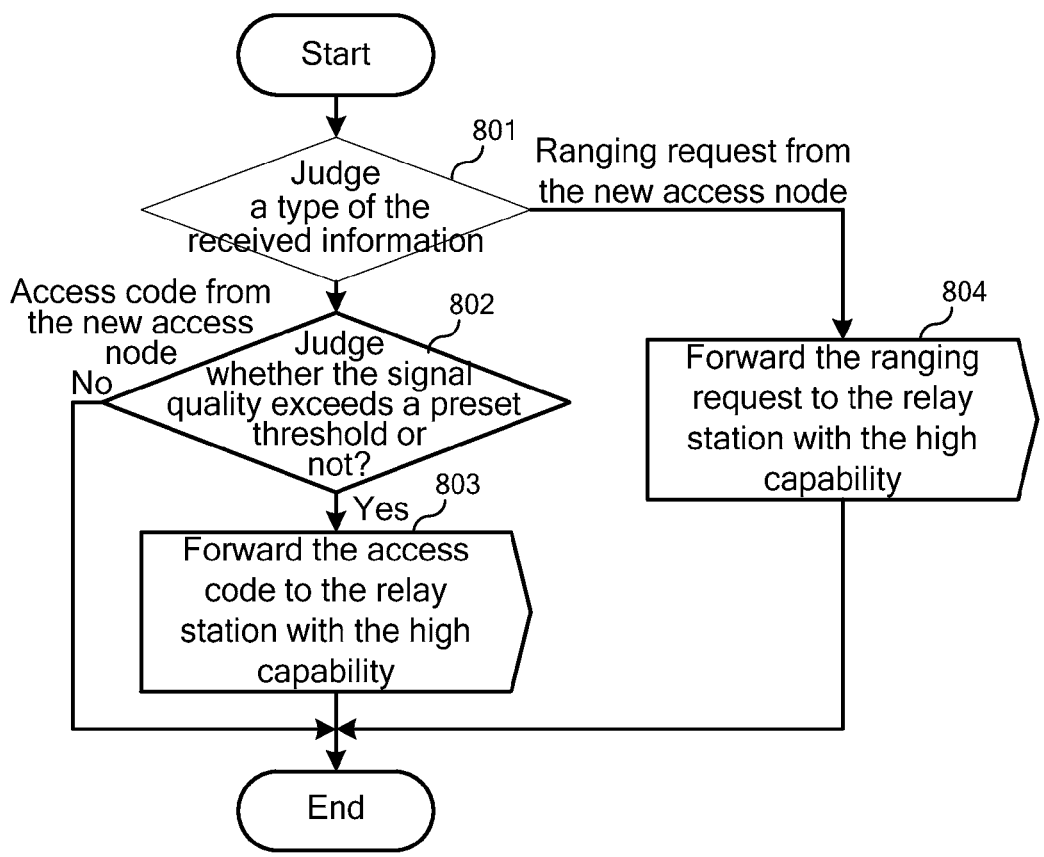
FIG. 8 is a flow chart of the processing performed by the relay station with low capability in the method for implementing the random access of the new access node according to the second embodiment of the present invention.

The processing flow of the relay station with low capability in this embodiment is as shown in FIG. 8.

At module for block or process 801, the relay station with low capability first judges a type of received information. For example, if the new access node is located within the coverage of the relay station with low capability, when the new access node sends the access code (initial ranging code), the relay station with low capability receives the initial ranging code sent from the new access node. If the relay station with low capability is the station with the best signal quality among all the stations that receive the signal from the same new access node, and the relay station with high capability has already allocated to the new access node the contention-free time frequency resource adapted to send information required for establishing the connection, the relay station with low capability receives the ranging request message sent from the new access node. Therefore, when receiving the information, the relay station with low capability needs to firstly judge the type of the received information.

If the information is the access code from the new access node, module for block or process 802 is performed. If the information is the ranging response message from the new access node, module for block or process 804 is performed.

At module for block or process 802, when receiving the access code from the new access node, the relay station with low capability judges whether the signal quality of the access code exceeds a preset threshold or not. The evaluation indexes for the signal quality of the access code adopted by the relay station with low capability include a signal intensity, a time synchronization difference of the signal with respect to the relay station with low capability, and a carrier frequency difference of the signal with respect to the relay station with low capability. If the signal quality of the access code exceeds the preset threshold, module for block or process 803 is performed, in which the relay station with low capability forwards the access code to the relay station with high capability via a report message, and the report message includes a received signal intensity parameter P, a carrier frequency difference Δf of the new access node with respect to the relay station with low capability, a time synchronization difference ΔT of the new access node with respect to the relay station with low capability and the like, so as to provide a reliable reference for the relay station with low capability to select the station with the best signal quality of the access code received from the new access node.

When the relay station with low capability receives the ranging request message from the new access node, module for block or process 804 is performed, in which the relay station with low capability forwards the ranging request message to the relay station with high capability.

For example, the station with the best signal quality of the received access code selected by the relay station with high capability is the relay station with low capability, and thus the method for implementing the random access of the new access node is further described below.

Figure 9:
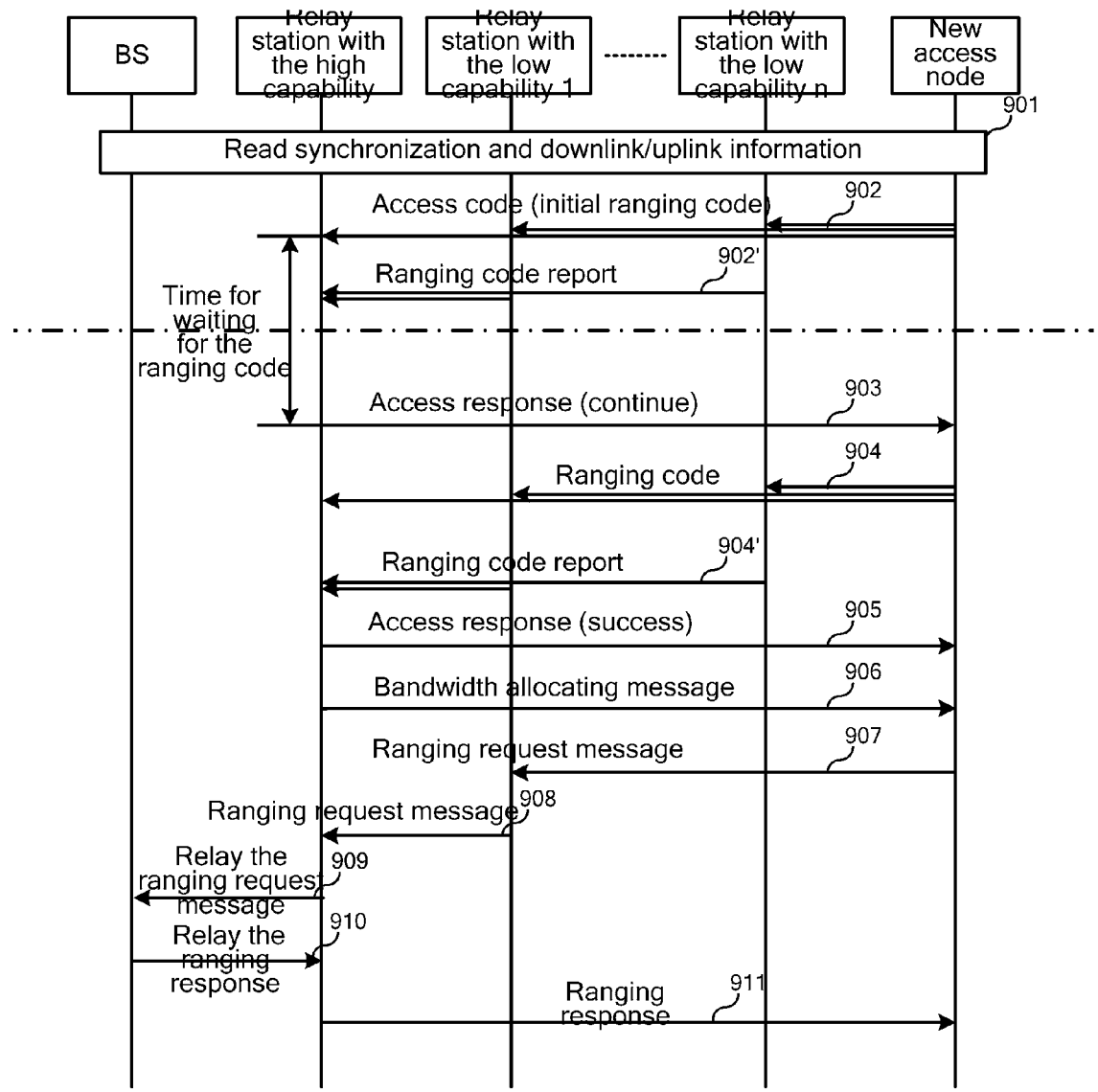
FIG. 9 is a flow chart of the method for implementing the random access of the new access node according to the second embodiment of the present invention when the station with the best signal quality of the received access code is the relay station with low capability.

The detailed flow is shown in FIG. 9. At module for block or process 901, the preparation works before a ranging process is performed, that is, the step before the ranging process in the network access process is performed. The new access node (a relay station or a mobile terminal) firstly establishes synchronization with a service node, so as to acquire downlink and uplink parameters. Among the uplink parameter, a ranging code set and a ranging region position in an uplink frame need to be acquired.

At module for block or process 902, the new access node selects an initial ranging code, selects a ranging position at the ranging region, and sends the initial ranging code from the ranging position, that is, sends an access code. The new access node may be a mobile terminal or a relay station. The initial ranging codes sent from the relay station and the mobile terminal may be distributed in different intervals, so as to reduce a possibility of a conflict between the relay station and the mobile terminal, and to lower an average access time of the relay station. If a collision occurs during the ranging, and no access response message is received within the time regulated in the protocol, the new access node repeatedly sends the initial ranging code according to a compromise policy regulated in the protocol till certain times are reached.

If any relay station with low capability exists in a transferring scope of an access code signal, module for block or process 902' is performed, in which the relay station with low capability receives the access code, and notifies the relay station with high capability via a ranging code report message, and the message carries the received signal intensity parameter (for example, an average power or a signal noise ratio) P, the carrier frequency difference $\Delta f$ of the new access node with respect to the relay station with low capability, and the time synchronization difference $\Delta T$ of the new access node with respect to the relay station with low capability. The ranging code report message should be sent with a basic CID of the relay station with low capability, the message type thereof may select a non-occupied number in the protocol 802.16e, and the format thereof is the same as the ranging code report message of the first embodiment, so it is not described here.

When receiving the access code from the new access node, each relay station with low capability may judge whether the signal quality of the access code exceeds the preset threshold or not, and if yes, each relay station with low capability notifies the relay station with high capability via the ranging code report message; otherwise, the access code is ignored. In this manner, the relay stations with low capability that have a poor signal quality of the received access code do not need to send the access code report message, thereby saving the system resource in the relay station with high capability.

At module for block or process 903, the relay station with high capability collects the access code received by the relay station with high capability itself and the access code forwarded by each relay station with low capability via the report message from the same new access node, and sends an access response message. Particularly, the relay station with high capability waits for a period of time after receiving the access code of the new access node by the relay station with high capability itself, and if no access code from the new access node transferred by each relay station with low capability via the report message is received by the relay station with high capability within the period of time, the relay station with high capability utilizes itself as a station with a best signal quality of the received access code; otherwise, the relay station with high capability selects the station with the best signal quality of the received access code via a selecting algorithm. The detailed selecting algorithm is similar to that of the first embodiment. The relay station with high capability respectively computes $|\Delta f_i \cdot \Delta T_i|/P_i$, selects a station with a minimum $|\Delta f_i \cdot \Delta T_i|/P_i$ value as the station with the best signal quality, in which i=0, 1, . . . , k, and k is a number of the relay stations with low capability for forwarding the access code. The access code corresponding to $|\Delta f_0 \cdot \Delta T_0|/P_0$ is an access code received by the relay station with high capability itself $P_0 = P^{BS} + P\_Offset$, $P^{BS}$ is a signal intensity of the access code, P_Offset is a fixed parameter greater than 0, $\Delta f_0$ is a carrier frequency difference of the selected station, $\Delta T_0$ is a time synchronization difference of the selected station, and when i is not equal to 0, $P_i$ is a signal intensity of an access code received by the $i^{th}$ relay station with low capability, $\Delta f_i$ is a carrier frequency difference of the $i^{th}$ relay station with low capability, $\Delta T_i$ is a time synchronization difference of the $i^{th}$ relay station with low capability. The above algorithm ensures the relay station with high capability to select the station with the best signal quality of the received access code. In this embodiment, the selected station with the best received signal quality is a relay station with low capability 1.

Then, the relay station with high capability generates the access response message, and sends the access response message to the new access node. The relay station with low capability in this embodiment does not send a downlink broadcasting message, so that the relay station with high capability directly sends the access response message to the new access node.

It is assumed that the signal quality of the access code selected in this step is still not desirable, so that a ranging state in the access response message is "Continue". Thus, the relay station with high capability instructs to adjust the parameters of the new access node adapted to get access to the channel according to the parameters of the relay station with low capability 1, so as to ensure the new access node to successfully get access to the channel.

Through comparing with the first embodiment, it is easily found that, modules 901 to 903 correspond to the modules 501 to 504. In the first embodiment, the synchronization station is the base station, so that each relay station with low capability notifies the access code from the new access node to the base station via the ranging code report message, and the base station selects the station with the best signal quality of the received access code, and returns the access response message. In this embodiment, the synchronization station is the relay station with high capability, so that each relay station with low capability notifies the access code from the new access node to the relay station with high capability via the ranging code report message, and the relay station with high capability selects the station with the best signal quality of the received access code and returns the access response message.

At module for block or processes 904 and 904' are substantially same as the modules 902 and 902' respectively, which thus are not described here.

At module for block or process 905, the relay station with high capability collects the access code received by the relay station with high capability itself and the access code forwarded by each relay station with low capability via the report message from the same new access node, selects the station with the best signal quality of the received access code, and sends the access response message. This module is substantially similar to the module 903, but the difference therebetween lies in that, at the module 903, the signal quality of the access code selected by the relay station with high capability is not desirable; but at the module for block or process 905, the signal quality of the access code selected by the relay station with high capability is sufficiently high. Thus, the ranging state in the access response message directly sent from the relay station with high capability to the new access node is "Success".

At module for block or process 906, the relay station with high capability allocates a contention-free bandwidth to the new access node via a bandwidth allocating message (CDMA_Allocation_IE), in which the contention-free bandwidth is for sending the ranging request message by the new access node.

At module for block or process 907, after receiving the bandwidth allocating message carrying the allocated contention-free time frequency resource information, the new access node sends the ranging request message carrying a MAC address of the new access node in the allocated contention-free time frequency resource. The ranging request message is forwarded to the relay station with high capability via the relay station with low capability 1. Therefore, at this module for block or process, the relay station with low capability 1 receives the ranging request message.

At module for block or process 908, the relay station with low capability 1 forwards the ranging request message to the relay station with high capability.

At module for block or process 909, after receiving the forwarded ranging request message, the relay station with high capability encapsulates the ranging request message with a basic CID of the relay station with high capability itself, and forwards the ranging request message to a base station, in which the encapsulated message is called a forwarded ranging request (REL_RNG-REQ) message, and the content of the message is substantially the same as that of the original ranging request message.

At module for block or process 910, after receiving the forwarded ranging request, the base station extracts ranging request message parameters sent from the new access node, and then allocates a CID to the new access node. The message mainly includes the MAC address, a basic CID, and a main management CID of the new access node. Then, the base station generates a ranging response message. The ranging response message is forwarded to the new access node via the relay station with high capability. Therefore, at the module 910, the base station encapsulates the ranging response message with the CID of the relay station with high capability, and sends the ranging response message to the relay station with high capability. The encapsulated message is called a forwarded ranging response (REL_RNG-RSP) message.

At module for block or process 911, after receiving the ranging response message, the relay station with high capability extracts a corresponding ranging response message, and sends the ranging response message to the new access node with an initial CID (i.e., CID=0).

It can be known that, even if both the relay station with high capability and the relay station with low capability exist in the transferring link from the new access node to the base station, the solution of the present invention also can be applied to enable the new access node within the coverage of the relay station to implement the random access process.

If the relay station with low capability needs to forward the access code received from the new access node to the relay station with high capability via the report message through other relay stations with low capability, and the relay station with low capability is the station with the best signal quality of the received access code, the base station interacts with the new access node via the forwarding of the relay station with high capability and a plurality of relay stations with low capability, so as to implement an access of the new access node. That is to say, this embodiment is not only applicable to a double-hop system, but also applicable to a multi-hop system.

In addition, the relay station with low capability in this embodiment cannot send a downlink broadcasting message, so that the relay station with high capability directly sends the access response message, the bandwidth allocating message, and the forwarded ranging response message to the new access node. If the relay station with low capability that have the best signal quality of the received access code can send a downlink broadcasting message, the relay station with low capability is adapted to forward the access response message, the bandwidth allocating message, and the ranging response message.

In a third embodiment of the present invention, a method for implementing a random access of a new access node is provided. This embodiment is substantially the same as the second embodiment, but the difference there-between lies in that, in the second embodiment, the station with the best signal quality of the received access code selected by the relay station with high capability is the relay station with low capability 1; but in this embodiment, the station with the best signal quality of the received access code selected by the relay station with high capability is the relay station with high capability itself. Therefore, during an interaction process between the new access node and the relay station with high capability, the relaying operation of the relay station with low capability is not required, so that the new access node directly interacts with the relay station with high capability. Furthermore, the relay station with high capability adjusts the signal parameters of the new access node adapted to perform the random access process according to the parameters of the relay station with high capability itself.

In a fourth embodiment of the present invention, a system for implementing a random access of a new access node is provided, which includes a new access node, at least one relay station, and a synchronization station, in which the synchronization station is a base station, and the relay station is a relay station with low capability.

The relay station with low capability includes a forwarding module and a judging module. The forwarding module is adapted to notify an access code received from the new access node to the synchronization station via a ranging code report message. In this embodiment, the synchronization station is the base station. The judging module is adapted to judge whether a signal quality of the access code exceeds a preset threshold or not before the forwarding module notifies the access code received from the new access node to the base station via the ranging code report message, and if yes, the judging module instructs the forwarding module to forward the access code to the base station via the ranging code report message.

The base station includes a selection module and an interacting module. The selection module is adapted to select a station with a best signal quality of a received access code according to the access code received from each relay station with low capability and the access code received by the base station itself from the same new access node. The interacting module is adapted to allocate to the new access node a bandwidth for sending a ranging request message, and interact with the new access node via a relay station with low capability when the station selected by the selection module is the relay station with low capability, so as to implement an access of the new access node. When the station selected by the selection module is the base station itself, the interacting module directly interacts with the new access node, so as to implement the access of the new access node. In this manner, the new access node within a coverage of the relay station can randomly get access to a channel, thereby sufficiently utilizing the advantages brought by the relay station to the system.

The new access node may be a mobile terminal or a relay station, so that the mobile terminal and the relay station within the coverage of the relay station may successfully implement the access.

In a fifth embodiment of the present invention, a system for implementing a random access of a new access node is provided, which includes a new access node, at least one relay station with low capability, a relay station with high capability, and a base station.

The relay station with low capability includes a forwarding module and a judging module. The forwarding module is adapted to notify an access code received from the new access node to the synchronization station via a ranging code report message. In this embodiment, the synchronization station is the relay station with high capability. The judging module is adapted to judge whether a signal quality of the access code exceeds a preset threshold or not before the forwarding module forwards the access code received from the new access node to the relay station with high capability, and if yes, the judging module instructs the forwarding module to forward the access code to the relay station with high capability via the ranging code report message.

The relay station with high capability includes a selection module and an allocating module. The selection module is adapted to select a station with a best signal quality of a received access code according to the access code received from each relay station with low capability and the access code received by the relay station with high capability itself from the same new access node. The allocating module is adapted to allocate to the new access node a bandwidth for sending a ranging request message, when the signal quality of the access code received by the station selected by the selection module is sufficiently high.

If the station selected by the selection module of the relay station with high capability is the relay station with low capability, the base station interacts with the new access node via the relay station with high capability and the relay station with low capability, so as to implement an access of the new access node. If the station selected by the selection module of the relay station with high capability is the relay station with high capability itself, the base station interacts with the new access node via the relay station with high capability, so as to implement the access of the new access node. Therefore, under the situation that the system includes both the relay station with high capability and the relay station with low capability, the new access node within the coverage of the relay station is ensured to randomly get access to a channel, thereby sufficiently utilizing the advantages brought by the relay station to the system.

Figure 10:
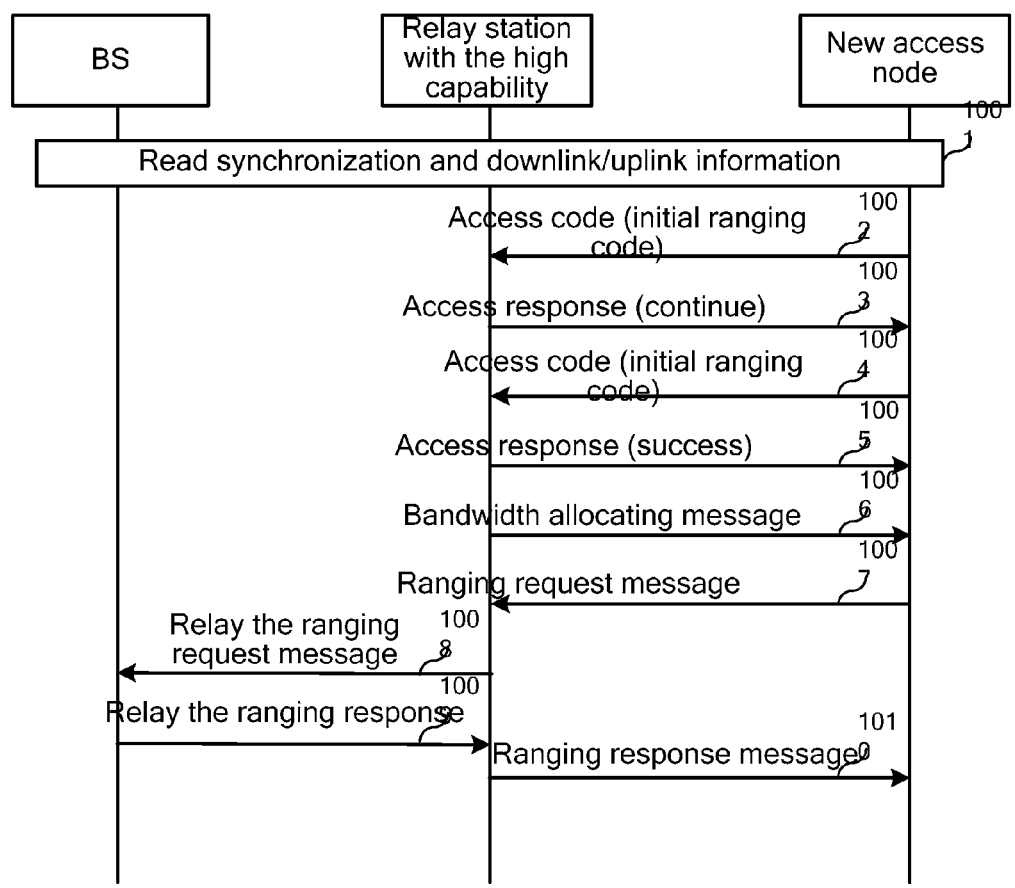
FIG. 10 is a flow chart of a method for implementing a random access of a new access node according to a sixth embodiment of the present invention.

In a sixth embodiment of the present invention, a method for implementing a random access of a new access node is provided, and the detailed flow thereof is shown in FIG. 10.

At module for block or process 1001, the preparation works before a ranging process is performed, that is, a step before the ranging process in the network access process is performed. The new access node (a relay station or a mobile terminal) firstly establishes synchronization with a service node, so as to acquire downlink and uplink parameters. Among the uplink parameters, a ranging code set and a ranging region position in an uplink frame need to be acquired.

At module for block or process 1002, the new access node selects an initial ranging code, selects a ranging position at the ranging region, and sends the initial ranging code from the ranging position, that is, sends an access code. The new access node may be a mobile terminal or a relay station. The initial ranging codes sent from the relay station and the mobile terminal may be distributed in different intervals, so as to reduce a possibility of a conflict between the relay station and the mobile terminal, and to lower an average access time of the relay station. If a collision occurs during the ranging process, and no ranging response message is received in the time regulated in the protocol, the new access node repeatedly send the initial ranging code according to a compromise policy regulated in the protocol till certain times are reached.

At module for block or process 1003, when receiving the access code, the relay station with high capability generates an access response message according to a signal quality of the access code, and sends the access response message to the new access node. If the signal quality of the access code is sufficiently high (for example, a threshold is preset, and if the signal quality of the access code reaches the preset threshold, it is considered that the signal quality of the access code is sufficiently high), the relay station with high capability further needs to send a bandwidth allocating message (CDMA_Allocation_IE) to the new access node, so as to allocate to the new access node a contention-free bandwidth for sending a ranging request message.

It is assumed that the signal quality of the received access code at the module 1003 is still not desirable, so that the relay station with high capability sends the access response message with a ranging state as "Continue" to the new access node. The relay station with high capability adjusts parameters of the new access node adapted to get access to a channel according to the parameters of the relay station with high capability itself, so as to ensure the new access node to successfully get access to the channel.

Module for block or process 1004 is substantially same as the module 1002, so it is not described repeatedly.

Module for block or process 1005 is substantially the same as the module 1003, but the difference there-between lies in that, at the module 1003, the signal quality of the access code received by the relay station with high capability is not desirable; but in this module, the signal quality of the access code received by the relay station with high capability is sufficiently high, so that the relay station with high capability sends the access response message with the ranging state as "Success" to the new access node, and further needs to allocate to the new access node the contention-free bandwidth for sending the ranging request message.

At module for block or process 1006, the relay station with high capability allocates the contention-free bandwidth to the new access node via the bandwidth allocating message (CDMA_Allocation_IE), and the contention-free bandwidth is for sending the ranging request message by the new access node.

At module for block or process 1007, after receiving the bandwidth allocating message carrying the allocated contention-free time frequency resource information, the new access node sends the ranging request message carrying a MAC address of the new access node in the specified contention-free time frequency resource.

At module for block or process 1008, after receiving the ranging request message, the relay station with high capability encapsulates the ranging request message with a basic CID of the relay station with high capability itself, and forwards the ranging request message to the base station, in which the encapsulated message is called a forwarded ranging request (REL_RNG-REQ) message, and the content of the message is substantially the same as that of the original ranging request message.

At module for block or process 1009, after receiving the forwarded ranging request, the base station extracts ranging request message parameters sent from the new access node, and then allocates a CID to the new access node. The message mainly includes the MAC address, a basic CID, and a main management CID of the new access node. Then, the base station generates a ranging response message. The ranging response message is sent to the new access node via the relay station with high capability. Therefore, in this step, the base station encapsulates the ranging response message with the CID of the relay station with high capability, and sends the ranging response message to the relay station with high capability. The encapsulated message is called a forwarded ranging response (REL_RNG-RSP) message.

At module for block or process 1010, after receiving the ranging response message, the relay station with high capability extracts a corresponding ranging response message, and sends the ranging response message to the new access node with an initial CID (i.e., CID=0), so as to implement the access of the new access node.

In a seventh embodiment of the present invention, a system for implementing a random access of a new access node is provided, which includes a base station, a relay station with high capability, and a new access node, in which the new access node may be a mobile terminal or a relay station.

The relay station with high capability includes: a module, adapted to send an access response message to the new access node according to a signal quality of an access request when receiving the access request from the new access node; a module, adapted to judge whether the signal quality of the access request received from the new access node exceeds a preset threshold or not; a module, adapted to allocate to the new access node a bandwidth for sending a ranging request message when the signal quality of the access request exceeds the preset threshold; and a module, adapted to send the ranging request message sent by the new access node to the base station.

The base station interacts with the new access node via the relay station with high capability, so as to implement an access of the new access node, so that the new access node within the coverage of the relay station is enabled to implement the random access.

Through comparison, it may be found that, the main difference between the technical solution of the present invention and that of the conventional art is that: in an embodiment of the present invention, when the new access node is located within the coverage of the relay station, each relay station notifies the access request sent by the new access node to the synchronization station via the report message; by means of comparing the signal quality of the access request received from each relay station and that of the access request received by the synchronization station itself from the same new access node, the synchronization station selects the station with the best signal quality of the received access request, so as to implement the access of the new access node according to the types of the selected station and the synchronization station, so that the new access node within the coverage of the relay station is enabled to implement the random access to channels, thereby sufficiently utilizing advantages brought by the relay stations to the system.

The synchronization station may be a base station or a relay station with high capability, and thus the solution of the present invention is not only applied to a system including merely relay stations with low capability, but also applied to a system including both relay stations with high capability and relay stations with low capability, thereby expanding the applications for the solution of the present invention.

The new access node may be a mobile terminal or a relay station, so that the mobile terminal and the relay station within the coverage of the relay station are enabled to successfully implement the access process.

The access request sent from the mobile terminal or the relay station serving as the new access node may be an initial ranging code. The initial ranging codes sent from the mobile terminal and the relay station may be distributed in different intervals, so as to reduce a possibility of a conflict between the relay station and the mobile terminal, and to lower an average access time of the relay station.

After receiving the access request from the new access node, the relay station with low capability firstly judges whether the signal quality of the access request exceeds the preset threshold or not, and if yes, the relay station with low capability forwards the access request to the synchronization station via the report message, so that relay stations with low capability with poor signal quality of the received access request do not need to forward the access request to the synchronization station, thereby saving the system resource in the synchronization station.

The report message sent from the relay station with low capability to the synchronization station includes a received signal intensity parameter P, a carrier frequency difference $\Delta f$ of the new access node with respect to the relay station with low capability, and a time synchronization difference $\Delta T$ of the new access node with respect to the relay station with low capability and the like, so as to provide a reliable reference for the synchronization station to select the station with the best signal quality.

If the station with the best signal quality selected by the synchronization station is the relay station with low capability, the synchronization station adjusts parameters of the new access node adapted to get access to a channel according to parameters of the relay station with low capability. If the station with the best signal quality selected by the synchronization station is the synchronization station itself, the synchronization station adjusts signal parameters of the new access node adapted to get access to the channel according to parameters of itself, so as to ensure the new access node to successfully get access to the channel.

The relay station with low capability may notify the access request received from the new access node to the synchronization station via the report message through other relay stations with low capability. Particularly, if the relay station with low capability is the station with the best signal quality of the received access request, and needs to interact with the synchronization station during an access process of the new access node, the synchronization station interacts with the new access node through the forwarding of a plurality of relay stations with low capability, so as to implement the access of the new access node. Thus, the solution of the present invention is not only applicable to a double-hop system, but also applicable to a multi-hop system, thereby expanding the applications of the present invention.

Under a situation that no relay station with low capability exists and only the base station, the relay station with high capability, and the new access node exist, if the signal quality of the access request received by the relay station with high capability from the new access node is sufficiently high, the relay station with high capability allocates to the new access node the bandwidth for sending the ranging request message, and sends the ranging request message from the new access node to the base station, and then the base station interacts with the new access node via the relay station with high capability, so as to implement the access of the new access node. In this manner, the new access node within the coverage of the relay station is enabled to implement the random access.

In this embodiment, the method for implementing the random access of the new access node has been described in detail, in which, for example, the station with the best signal quality is selected. Alternatively, a station with the lightest load may also be selected to implement the random access of the new access node, or a station with the best transfer capability may be selected to implement the random access of the new access node, in consideration of both the signal quality and the load situation. Particularly, before and when the access request is received, a load situation of each station may be acquired, and the station with the lightest load is selected. The methods for acquiring the load situation of each station and determining the station with the lightest load have been proposed in the conventional art, which are not described here. In consideration of both the signal quality and the load situation, the signal quality and the load situation may be scored in a manner of grading the signal quality information and the load information (for example, Level 1, Level 2, Level 3, Level 4, and Level 5, and Level 5 represents the best signal quality or the lightest load), and the station with the highest score is the station with the best transfer capability. The flow after selecting the station is the same as the above embodiments, and may be executed accordingly. The lightest load includes a minimum number of connected terminals and/or a minimum data amount of carried service data. In this embodiment, the station is selected according to the transfer capability at various aspects, so that the manner for selecting the station is more flexible, thereby satisfying various network environment demands.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for implementing a random access of a new access node, comprising:
receiving, by a synchronization station, at least one access request from a new access node directly or from at least one relay station via a reporting message, wherein the reporting message comprises: a received signal intensity parameter P, a carrier frequency difference $\Delta f$ of the new access node with respect to the at least one relay station, and a time synchronization difference $\Delta T$ of the new access node with respect to the at least one relay station;
selecting, by the synchronization station, a station with a minimum $|\Delta f_i \cdot \Delta T_i|/P_i$ value as a most appropriate station according to at least one access request, wherein i=0, 1, ..., k, and k is a number of the at least one relay station for forwarding the access request, wherein the station corresponding to $|\Delta f_0 \cdot \Delta T_0|/P_0$ is the synchronization station itself, $P_0 = P^{BS} + P\_Offset$, $P^{BS}$ is a signal intensity of the access request received by the synchronization station itself, P_Offset is a fixed parameter greater than 0, $\Delta f_0$ is a carrier frequency difference of the new access node with respect to the synchronization station, $\Delta T_0$ is a time synchronization difference of the new access node with respect to the synchronization station, and when i is not equal to 0, $P_i$ is a signal intensity of the access request received by an $i^{th}$ relay station, $\Delta f_i$ is a carrier frequency difference of the new access node with respect to the $i^{th}$ relay station, and $\Delta T_i$ is a time synchronization difference of the new access node with respect to the $i^{th}$ relay station; and
implementing an access of the new access node according to the station selected by the synchronization station and the synchronization station itself.

2. The method according to claim 1, wherein the most appropriate station is a station with a best transfer capability.

3. The method according to claim 2, wherein the station with a best transfer capability refers to a station with a minimum load capability, a station with a best quality of transferred signal, or a station with highest score in consideration of both the signal quality and the load situation.

4. The method according to claim 3, wherein an evaluation index for the signal quality is at least one member selected from a group comprising:
a signal intensity, a time synchronization difference between the signal and the at least one relay station the relay station with high capability, a carrier frequency difference between the signal and the at least one relay station the relay station with high capability, and any combination thereof.

5. The method according to claim 1, wherein if the synchronization station is a base station, and the selected most appropriate station is the base station itself or a relay station with low capability, the base station interacts with the new access node directly or via the relay station with low capability, so as to implement the access of the new access node.

6. The method according to claim 1, wherein if the selected most appropriate station is a relay station with low capability, and the synchronization station is a relay station with high capability, the relay station with high capability allocates to the new access node a bandwidth for sending a ranging request message, and sends the ranging request message sent from the new access node and forwarded via the relay station with low capability to a base station; and
the base station interacts with the new access node via the relay station with high capability and the relay station with low capability, so as to implement the access of the new access node.

7. The method according to claim 1, wherein if the selected most appropriate station is the synchronization station itself, and the synchronization station is a relay station with high capability, the relay station with high capability allocates to the new access node a bandwidth for sending a ranging request message, and forwards the ranging request message sent from the new access node to a base station; and
the base station interacts with the new access node via the relay station with high capability, so as to implement the access of the new access node.

8. The method according to claim 1, wherein the new access node is a mobile terminal, a relay station with low capability, or a relay station with high capability.

9. The method according to claim 1, wherein the access request from the new access node includes initial ranging codes.

10. The method according to claim 1, wherein after receiving the access request from the new access node, the at least one relay station notifies the access request to the synchronization station via the report message, if a signal quality of the access request exceeds a preset threshold.

11. The method according to claim 1, wherein if the station selected by the synchronization station is a relay station with low capability, the synchronization station adjusts signal parameters of the new access node adapted to implement the random access according to parameters of the relay station with low capability, or if the station selected by the synchronization station is the synchronization station itself, the synchronization station adjusts signal parameters of the new access node adapted to implement the random access according to parameters of the synchronization station itself.

12. A wireless communication system, comprising: at least one new access node, at least one relay station, and at least one synchronization station, wherein
the relay station comprises a forwarding module adapted to notify an access request received from the new access node to the synchronization station via a report message, wherein the report message comprises: a received signal intensity parameter P, a carrier frequency difference $\Delta f$ of the new access node with respect to the at least one relay station, and a time synchronization difference $\Delta T$ of the new access node with respect to the at least one relay station;
the synchronization station comprises: means for receiving an access request from a new access node directly or from at least one relay station via a reporting message, and a selection module, adapted to select a station with a minimum $|\Delta f_i \cdot \Delta T_i|/P_i$ value as a most appropriate station according to the access request, wherein i=0, 1, ..., k, and k is a number of the at least one relay station for forwarding the access request, wherein the station corresponding to $|\Delta f_0 \cdot \Delta T_0|/P_0$ is the synchronization station itself, $P_0 = P^{BS} + P\_Offset$, $P_{BS}$ is a signal intensity of the access request received by the synchronization station itself, P_Offset is a fixed parameter greater than 0, $\Delta f_0$ is a carrier frequency difference of the new access node with respect to the synchronization station, $\Delta T_0$ is a time synchronization difference of the new access node with respect to the synchronization station, and when i is not equal to 0, $P_i$ is a signal intensity of the access request received by an $i^{th}$ relay station, $\Delta f_i$ is a carrier frequency difference of the new access node with respect to the $i^{th}$ relay station, and $\Delta T_i$ is a time synchronization difference of the new access node with respect to the $i^{th}$ relay station; and the synchronization station is configured to implement an access of the new access node according to the selected station and the synchronization station itself.

13. The system according to claim 12, wherein the selection module is adapted to select a station with a minimum load capacity or a station with a best quality of transferred signal or a station with the highest score in consideration of both the signal quality and the load situation.

14. The system according to claim 12, wherein the relay station further comprises a judging module adapted to judge whether the signal quality of the access request exceeds a preset threshold or not after the relay station receives the access request from the new access node, and if yes, the judging module instructs the forwarding module to notify the access request to the synchronization station via the report message.

* * * * *